(12) United States Patent
Saito

(10) Patent No.: US 10,567,598 B2
(45) Date of Patent: Feb. 18, 2020

(54) INFORMATION PROCESSING APPARATUS AND METHOD OF CONTROLLING THE SAME

(71) Applicant: CANON KABUSHIKI KAISHA, Tokyo (JP)

(72) Inventor: Satoko Saito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 15/817,461

(22) Filed: Nov. 20, 2017

(65) Prior Publication Data
US 2018/0146105 A1   May 24, 2018

(30) Foreign Application Priority Data

Nov. 24, 2016 (JP) ................................. 2016-228030
Jun. 22, 2017 (JP) ................................. 2017-122238

(51) Int. Cl.
*H04N 1/00* (2006.01)
*G06K 15/02* (2006.01)
*G06F 3/12* (2006.01)

(52) U.S. Cl.
CPC ....... *H04N 1/00196* (2013.01); *H04N 1/0048* (2013.01); *H04N 1/00424* (2013.01); *H04N 1/00453* (2013.01); *H04N 1/00461* (2013.01); *H04N 2201/0089* (2013.01)

(58) Field of Classification Search
None
See application file for complete search history.

(56) References Cited

U.S. PATENT DOCUMENTS

| 4,679,077 A | * | 7/1987 | Yuasa | G08B 13/19602 340/518 |
| 6,608,697 B1 | * | 8/2003 | Schorr | G06Q 10/10 358/1.14 |
| 2003/0059123 A1 | * | 3/2003 | Omori | G06T 5/00 382/254 |
| 2004/0085578 A1 | * | 5/2004 | Quek | G06Q 30/02 358/1.18 |
| 2007/0019234 A1 | * | 1/2007 | Yamaguchi | G06F 3/1208 358/1.15 |
| 2007/0092153 A1 | * | 4/2007 | Kagaya | H04N 1/622 382/254 |

(Continued)

FOREIGN PATENT DOCUMENTS

| JP | 06-245052 | * | 9/1994 | ............ H04N 1/387 |
| JP | 2006-331301 | * | 12/2006 | ............ G06T 11/60 |

(Continued)

*Primary Examiner* — Beniyam Menberu
(74) *Attorney, Agent, or Firm* — Cowan, Liebowitz & Latman, P.C.

(57) ABSTRACT

An information processing apparatus includes an acquisition unit that acquires information regarding image quality of an image, an arrangement unit that arranges the image on one or a plurality of pages, a comparison unit that compares the information regarding image quality of a plurality of the images arranged on the pages, for each page, and a notification unit that performs notification, if there is a difference in the image quality of the plurality of the images arranged on the pages as a result of the comparison.

13 Claims, 13 Drawing Sheets

(56) References Cited

U.S. PATENT DOCUMENTS

| | | | |
|---|---|---|---|
| 2008/0046831 A1* | 2/2008 | Imai | G06F 15/025 |
| | | | 715/765 |
| 2009/0016579 A1* | 1/2009 | White | G16H 10/20 |
| | | | 382/128 |
| 2009/0040324 A1* | 2/2009 | Nonaka | H04N 5/232 |
| | | | 348/220.1 |
| 2010/0064176 A1* | 3/2010 | Negishi | G06F 3/121 |
| | | | 714/37 |
| 2014/0092424 A1* | 4/2014 | Grosz | G06F 3/1242 |
| | | | 358/1.15 |
| 2014/0104657 A1* | 4/2014 | Yamaneki | H04N 1/387 |
| | | | 358/3.01 |
| 2014/0193047 A1* | 7/2014 | Grosz | G06F 3/1242 |
| | | | 382/118 |
| 2014/0340714 A1* | 11/2014 | Hiraishi | G06F 3/1208 |
| | | | 358/1.18 |
| 2016/0086241 A1* | 3/2016 | Proulx | H04L 67/22 |
| | | | 705/26.4 |
| 2016/0277627 A1* | 9/2016 | Okamura | H04N 1/2307 |
| 2017/0039452 A1* | 2/2017 | Osindero | G06K 9/82 |
| 2017/0085941 A1* | 3/2017 | Gupta | H04N 21/4312 |
| 2017/0186407 A1* | 6/2017 | Mano | G09G 5/38 |
| 2017/0195578 A1* | 7/2017 | Neff | H04N 5/243 |

FOREIGN PATENT DOCUMENTS

| | | | |
|---|---|---|---|
| JP | 2008-197803 A | 8/2008 | |
| JP | 2008-269490 | * 11/2008 | G06T 1/00 |
| JP | 2010162818 | * 7/2010 | G06F 3/12 |
| JP | 2016-133967 A | 7/2016 | |

* cited by examiner

FIG. 3A

BOOK MANAGEMENT TABLE 300

| ITEM | TYPE |
|---|---|
| BOOK ID | INTEGER TYPE — 301 |
| TITLE | CHARACTER STRING TYPE — 302 |
| STATUS | CHARACTER STRING TYPE — 303 |
| BOOK CREATION START DATE AND TIME | DATE AND TIME TYPE — 304 |
| BOOK COMPLETION DATE AND TIME | DATE AND TIME TYPE — 305 |
| BOOK PRINT DATE AND TIME | DATE AND TIME TYPE — 306 |
| NUMBER OF PAGES | INTEGER TYPE — 307 |
| LAYOUT INFORMATION | CHARACTER STRING TYPE — 308 |

FIG. 3B

IMAGE MANAGEMENT TABLE 310

| ITEM | TYPE |
|---|---|
| IMAGE ID | INTEGER TYPE — 311 |
| IMAGE FILE PATH | CHARACTER STRING TYPE — 312 |
| THUMBNAIL FILE PATH | CHARACTER STRING TYPE — 313 |
| BOOK ID | INTEGER TYPE — 314 |
| IMAGE SIZE | INTEGER TYPE — 315 |
| IMAGE RESOLUTION | INTEGER TYPE — 316 |
| CAPTURING DEVICE NAME | CHARACTER STRING TYPE — 317 |
| IMAGE ACQUISITION SOURCE INFORMATION | CHARACTER STRING TYPE — 318 |
| IN-BOOK IMAGE QUALITY CHECK | CHARACTER STRING TYPE — 319 |

FIG. 3C

PAGE MANAGEMENT TABLE 320

| ITEM | TYPE |
|---|---|
| IMAGE ID LIST | INTEGER TYPE |
| PAGE NUMBER | INTEGER TYPE |
| BOOK ID | INTEGER TYPE |
| IN-PAGE IMAGE QUALITY CHECK | CHARACTER STRING TYPE |

FIG. 3D

CAPTURING DEVICE MANAGEMENT TABLE 330

| ITEM | TYPE |
|---|---|
| CAPTURING DEVICE NAME | CHARACTER STRING TYPE |
| DEVICE TYPE | CHARACTER STRING TYPE |
| IMAGE FILE PATH OF DEVICE ICON | CHARACTER STRING TYPE |

FIG. 3E

SNS SITE MANAGEMENT TABLE 340

| ITEM | TYPE |
|---|---|
| SNS SITE NAME | CHARACTER STRING TYPE |
| URL | CHARACTER STRING TYPE |
| ACCOUNT INFORMATION | CHARACTER STRING TYPE |
| IMAGE FILE PATH OF SNS ACCOUNT | CHARACTER STRING TYPE |

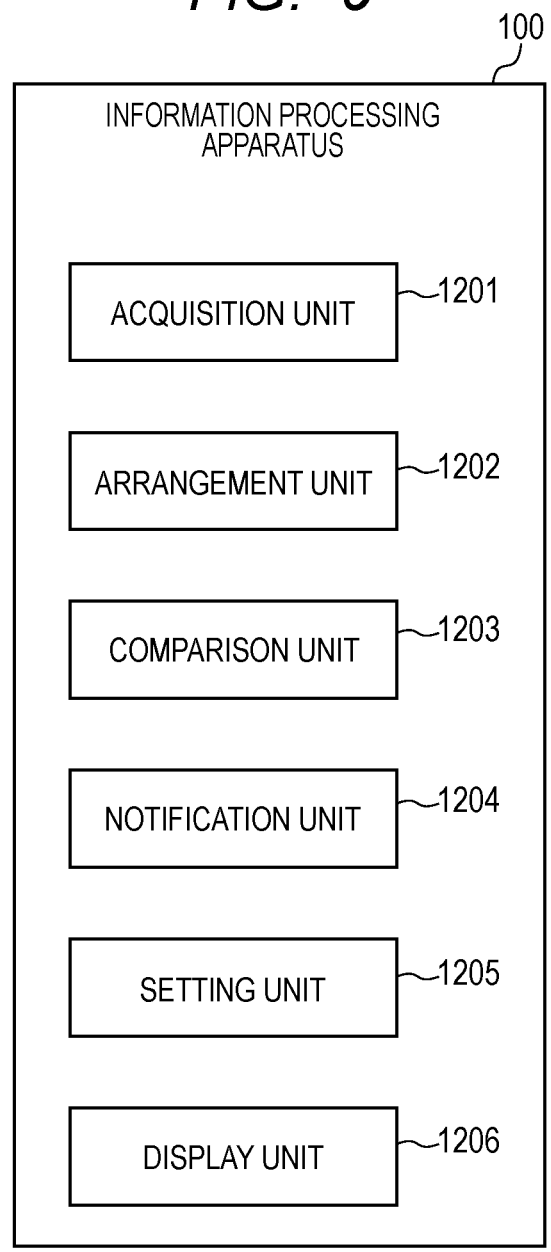

FIG. 10A

DOCUMENT MANAGEMENT TABLE 1300

| ITEM | TYPE | |
|---|---|---|
| DOCUMENT ID | INTEGER TYPE | ~1301 |
| TITLE | CHARACTER STRING TYPE | ~1302 |
| STATUS | CHARACTER STRING TYPE | ~1303 |
| NUMBER OF PAGES | INTEGER TYPE | ~1304 |
| LAYOUT TYPE | CHARACTER STRING TYPE | ~1305 |

FIG. 10B

PAGE MANAGEMENT TABLE 1310

| ITEM | TYPE | |
|---|---|---|
| PAGE NUMBER | INTEGER TYPE | ~1311 |
| DOCUMENT ID | INTEGER TYPE | ~1312 |
| IMAGE REGION ID LIST | INTEGER TYPE | ~1313 |
| PAGE LAYOUT INFORMATION | CHARACTER STRING TYPE | ~1314 |

FIG. 10C

IMAGE REGION MANAGEMENT TABLE 1320

| ITEM | TYPE | |
|---|---|---|
| IMAGE REGION ID | INTEGER TYPE | ~1321 |
| IMAGE ID | INTEGER TYPE | ~1322 |
| DOCUMENT ID | INTEGER TYPE | ~1323 |
| REGION SIZE | INTEGER TYPE | ~1324 |
| ENLARGEMENT RATIO | INTEGER TYPE | ~1325 |
| IMAGE QUALITY CHECK RESULT | INTEGER TYPE | ~1326 |

FIG. 10D

IMAGE MANAGEMENT TABLE 1330

| ITEM | TYPE | |
|---|---|---|
| IMAGE ID | INTEGER TYPE | ~1331 |
| IMAGE FILE PATH | CHARACTER STRING TYPE | ~1332 |
| THUMBNAIL FILE PATH | CHARACTER STRING TYPE | ~1333 |
| DOCUMENT ID | INTEGER TYPE | ~1334 |
| IMAGE SIZE | INTEGER TYPE | ~1335 |
| IMAGE RESOLUTION | INTEGER TYPE | ~1336 |

INFORMATION PROCESSING APPARATUS AND METHOD OF CONTROLLING THE SAME

BACKGROUND OF THE INVENTION

Field of the Invention

The present invention relates to an information processing apparatus for creating a document and a method of controlling the information processing apparatus.

Description of the Related Art

In recent years, a document creation application for automatically arranging a plurality of images on a page of a document is known. Japanese Patent Application Laid-Open No. 2016-133967 discloses an image layout application for arranging images on pages of a photo book.

In the document creation application, images acquired from different sources, such as images captured with different capturing devices or images downloaded from a social networking service (SNS) site, can be arranged on pages of one photo book. However, such images from different sources are often different in image quality. There is a problem that, when images having a difference in image quality are arranged close to each other, the difference in image quality stands out, and the appearance of the page of the photo book is deteriorated.

SUMMARY OF THE INVENTION

According to one aspect of the present invention, there is provided an information processing apparatus including: an acquisition unit configured to acquire information regarding image quality of an image; an arrangement unit configured to arrange the image on one or a plurality of pages; a comparison unit configured to compare the information regarding image quality of a plurality of the images arranged on the pages, for each page; and a notification unit configured to perform notification, if there is a difference in the image quality of the plurality of the images arranged on the pages as a result of the comparison as a result of the comparison.

According to another aspect of the present invention, there is provided a method of controlling an information processing apparatus, the method including: acquiring information regarding image quality of an image; arranging the image on one or a plurality of pages; comparing the information regarding image quality of a plurality of the images arranged on the pages, for each page; and performing notification, if there is a difference in the image quality of the plurality of the images arranged on the pages as a result of the comparison as a result of the comparison.

According to another aspect of the present invention, there is provided a non-transitory computer-readable storage medium storing a program that, when executed by a processor, cause the processor to perform operations comprising: acquiring information regarding image quality of an image; arranging the image on one or a plurality of pages; comparing the information regarding image quality of a plurality of the images arranged on the pages, for each page; and performing notification, if there is a difference in the image quality of the plurality of the images arranged on the pages as a result of the comparison.

According to another aspect of the present invention, there is provided an information processing apparatus including: an arrangement unit configured to arrange content on a page; a display unit configured to display, on a screen, the page on which the content is arranged; a comparison unit configured to compare an attribute of the content and a predetermined condition; a notification unit configured to display, on the screen, notification information based on a result of the comparison; and a setting unit configured to set an amount of the notification information to be displayed, wherein the notification unit is configured to display the notification information on the screen according to the set amount.

According to another aspect of the present invention, there is provided a method of controlling an information processing apparatus, the method including: arranging content on a page of a document; displaying, on a screen, the page on which the content is arranged; comparing an attribute of the content and a predetermined condition; displaying, on the screen, notification information based on a result of the comparison; and setting an amount of the notification information to be displayed, wherein the notification information is displayed on the screen according to the set amount.

Further features of the present invention will become apparent from the following description of exemplary embodiments with reference to the attached drawings.

BRIEF DESCRIPTION OF THE DRAWINGS

FIG. 3A is a diagram for describing a book management table according to the first embodiment.

FIG. 3B is a diagram for describing an image management table according to the first embodiment.

FIG. 3C is a diagram for describing a page management table according to the first embodiment.

FIG. 3D is a diagram for describing a capturing device management table according to the first embodiment.

FIG. 3E is a diagram for describing an SNS site management table according to the first embodiment.

FIG. 9 is a functional block diagram of an information processing apparatus according to a second embodiment.

FIG. 10A is a diagram for describing a document management table according to the second embodiment.

FIG. 10B is a diagram for describing a page management table according to the second embodiment.

FIG. 10C is a diagram for describing an image region management table according to the second embodiment.

FIG. 10D is a diagram for describing an image management table according to the second embodiment.

DESCRIPTION OF THE EMBODIMENTS

Preferred embodiments of the present invention will now be described in detail in accordance with the accompanying drawings.

First Embodiment

Figure 1:
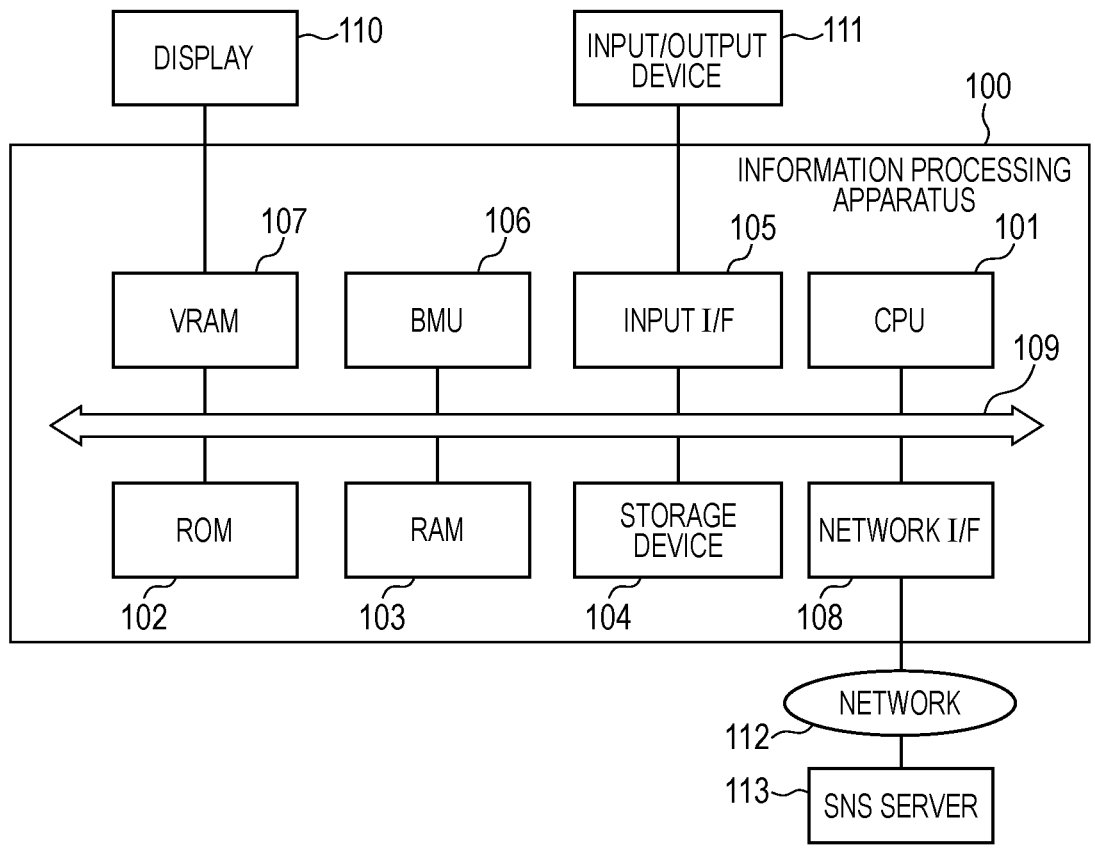
FIG. 1 is a block diagram illustrating a hardware configuration of an information processing apparatus according to a first embodiment.

FIG. 1 is a block diagram illustrating a hardware configuration of an information processing apparatus 100 according to the present embodiment. The information processing apparatus 100 includes a central processing unit (CPU) 101, a read only memory (ROM) 102, a random access memory (RAM) 103, a storage device 104, and an input/output interface (I/F) 105. The information processing apparatus 100 further includes a bit move unit (BMU) 106, a video RAM (VRAM) 107, a network I/F 108, and a system bus 109. The information processing apparatus 100 is connected with a display 110 and an input/output device 111. The information processing apparatus 100 is connected to a network 112 and can communicate with an external device such as a social networking service (SNS) server 113 through the network 112.

The CPU 101 controls operations of the units of the information processing apparatus 100. The ROM 102 stores programs that do not require change, various parameters, and the like. The RAM 103 provides a memory area necessary for the operation of the CPU 101, and temporarily stores programs, data, and the like read from the ROM 102, the storage device 104, and the like.

The storage device 104 is, for example, a hard disk fixed to the information processing apparatus 100, a memory card detachable from the information processing apparatus 100, or the like. The storage device 104 stores basic programs such as an operating system (OS), an application program for creating documents, and the like. The storage device 104 also stores image data acquired from a local device, and image data acquired from, for example, the SNS server 113 through the network 112.

The input/output I/F 105 is an interface such as a universal serial bus (USB) or a wireless local area network (LAN), and is connected with the input/output device 111. The input/output device 111 may include a pointing device for inputting data and instructions in response to a user operation, an input device such as a keyboard, and a printer (printing device) for outputting images. The BMU 106 controls data transfer between memories and between a memory and devices. For example, the BMU 106 controls data transfer between the VRAM 107 and the RAM 103, data transfer between the network I/F 108 and the storage device 104, and the like.

The VRAM 107 temporarily holds image data to be displayed on the display 110. The image data in the VRAM 107 is transmitted to the display 110 according to a predetermined specification. The display 110 is, for example, a liquid crystal display or an organic light emitting display, and performs display on the basis of the image data from the VRAM 107.

The network I/F 108 establishes connection with the network 112 such as the Internet, and performs data communication with an external device through the network 112. The system bus 109 communicatively connects the CPU 101, the ROM 102, the RAM 103, the storage device 104, the input/output I/F 105, the BMU 106, the VRAM 107, and the network I/F 108.

The information processing apparatus 100 may be realized by a single computer device or may be realized by distribution of functions to a plurality of computer devices as needed. In the case where the information processing apparatus 100 is configured from a plurality of computer devices, the computer devices are connected through a communication line such as a LAN so that the computer devices can communicate with one another.

Figure 2:
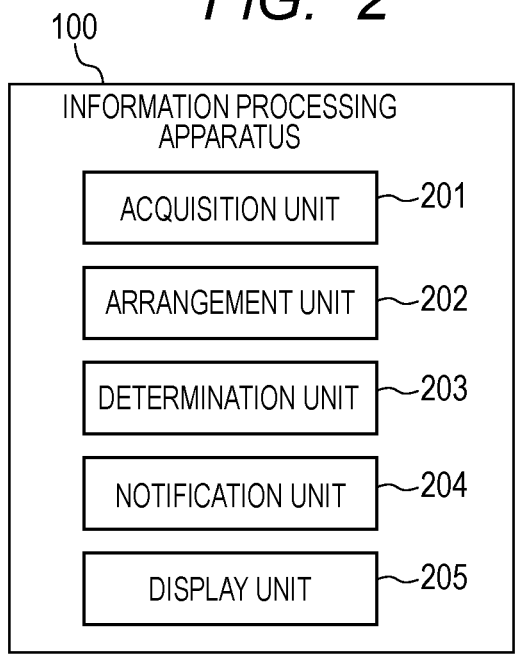
FIG. 2 is a functional block diagram of the information processing apparatus according to the first embodiment.

FIG. 2 is a functional block diagram of the information processing apparatus 100 according to the present embodiment. The information processing apparatus 100 includes an acquisition unit 201, an arrangement unit 202, a determination unit 203, a notification unit 204, and a display unit 205. The acquisition unit 201 acquires image quality of images managed by the information processing apparatus 100. The arrangement unit 202 arranges images on one or a plurality of pages. The determination unit 203 determines whether or not the image quality of a plurality of images arranged on a page is at the same level. The notification unit 204 notifies information indicating that the image quality is not at the same level when the image quality is determined not to be at the same level by the determination unit. The display unit 205 displays, on the display 110, thumbnail images corresponding to the plurality of images arranged on the page. The functions of the information processing apparatus 100 are realized by the CPU 101 reading and executing predetermined programs stored in the ROM 102 and the storage device 104. That is, the CPU 101 may function as the acquisition unit 201, the arrangement unit 202, the determination unit 203, the notification unit 204, and the display unit 205.

Hereinafter, as an embodiment of the present invention, the information processing apparatus 100 for supporting creation of a nice-looking photo book and a computer program (hereinafter referred to as "the present program") operable on the information processing apparatus 100 will be described. The information processing apparatus 100 and the present program use various management tables as illustrated in FIGS. 3A to 3E as needed. The management tables may be stored in the RAM 103 and the storage device 104 and used.

A book management table 300 illustrated in FIG. 3A manages information of a photo book identified with a book ID 301. The book ID 301 is an ID that is issued when creation of the book is started. The book management table 300 includes a status 303 of the book and a book creation start date and time 304. Further, the book management table 300 includes a title 302, the number of pages 307, and layout information 308 of a page, of the book, set by a user at the start of book creation. The layout information 308 of a page indicates information regarding longitudinal and lateral sizes of the page prepared in the present program in advance, the number of images and image arrangement in the page, the size of an image area of each image arrangement, and the like, and the information corresponds to one selected from some templates by the user. The layout information of the book may be commonly set in the entire book, or implementation to enable setting change for each page is also possible. The present invention is not limited to this embodiment. When editing of the book is completed, book completion date and time 305 is recorded in the book management table 300. When the book is printed, book print date and time 306 is recorded in the book management table 300.

An image management table 310 illustrated in FIG. 3B manages information of images identified with an image ID 311. The image ID 311 is an ID issued at the timing when the user acquires an image from a local device or an SNS cooperation site. The image management table 310 includes an image file path 312, a thumbnail file path 313, and a book ID 314 to which the image belongs. The image file path 312 and the thumbnail file path 313 respectively indicate paths to access an image file and a thumbnail file from the present program. The thumbnail file path 313 is used for display on the display 110, and the image file path 312 is used for printing. The image management table 310 includes image acquisition source information 318 as to whether the user has acquired the image file from the local device or from the SNS site. The image management table 310 also includes an image size 315 and a capturing device name 317 included in meta information of the image file. The image size is a pixel size expressed by the numbers of pixels in vertical and horizontal directions of the image. Further, the present program checks the quality of all the images in the book, and if there is variation, the result is recorded in an item of in-book image quality check 319 in the image management table 310.

A page management table 320 illustrated in FIG. 3C manages information of a page identified with a book ID 323 and a page number 322. The page management table 320 includes an image ID list 321 of images arranged on the page. Further, the present program checks the quality of all the images in the page, and if there is variation, the result is recorded in an item of in-page image quality check 324 in the page management table 320.

A capturing device management table 330 illustrated in FIG. 3D manages information of a capturing device identified with a capturing device name 331. Information of capturing devices is included in the present program in advance, and a device type 332, such as a smartphone, a compact digital camera, or a single lens reflex camera, is associated with the capturing device name 331. Further, the capturing device management table 330 includes an image file path 333 of a device icon that allows a user to easily distinguish the device type 332. The capturing device name 331 may be stored on a network, for example, so that a latest state can be collected in real time.

An SNS site management table 340 illustrated in FIG. 3E indicates SNS site information and the image can be identified with an SNS site name 341 acquirable by the present program in cooperation with the site. The SNS site management table 340 includes a uniform resource locator (URL) 342 of the SNS site, account information 343 for logging on to the SNS site to acquire an image, and an image file path 344 of an icon representing the SNS site.

Figure 4:
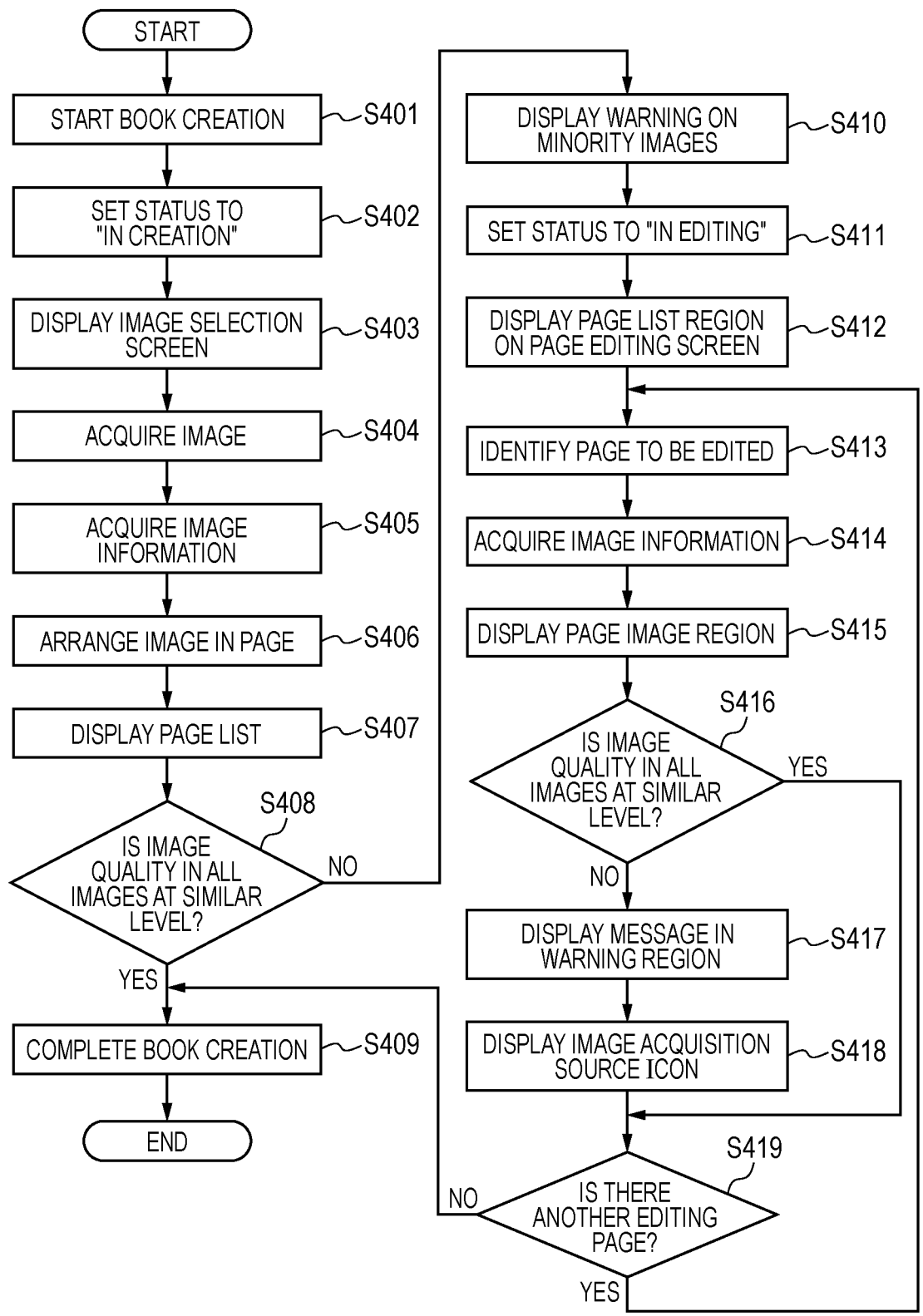
FIG. 4 is a flowchart illustrating document creation processing according to the first embodiment.

FIG. 4 is a flowchart illustrating document creation processing according to the present embodiment. Here, an operation when the information processing apparatus 100 creates a photo book will be described. The information processing apparatus 100 notifies a user by displaying a warning when there are images having the image quality that is not at the same level in a page of the photo book, to support the user to create a nice-looking photo book.

Figure 5:
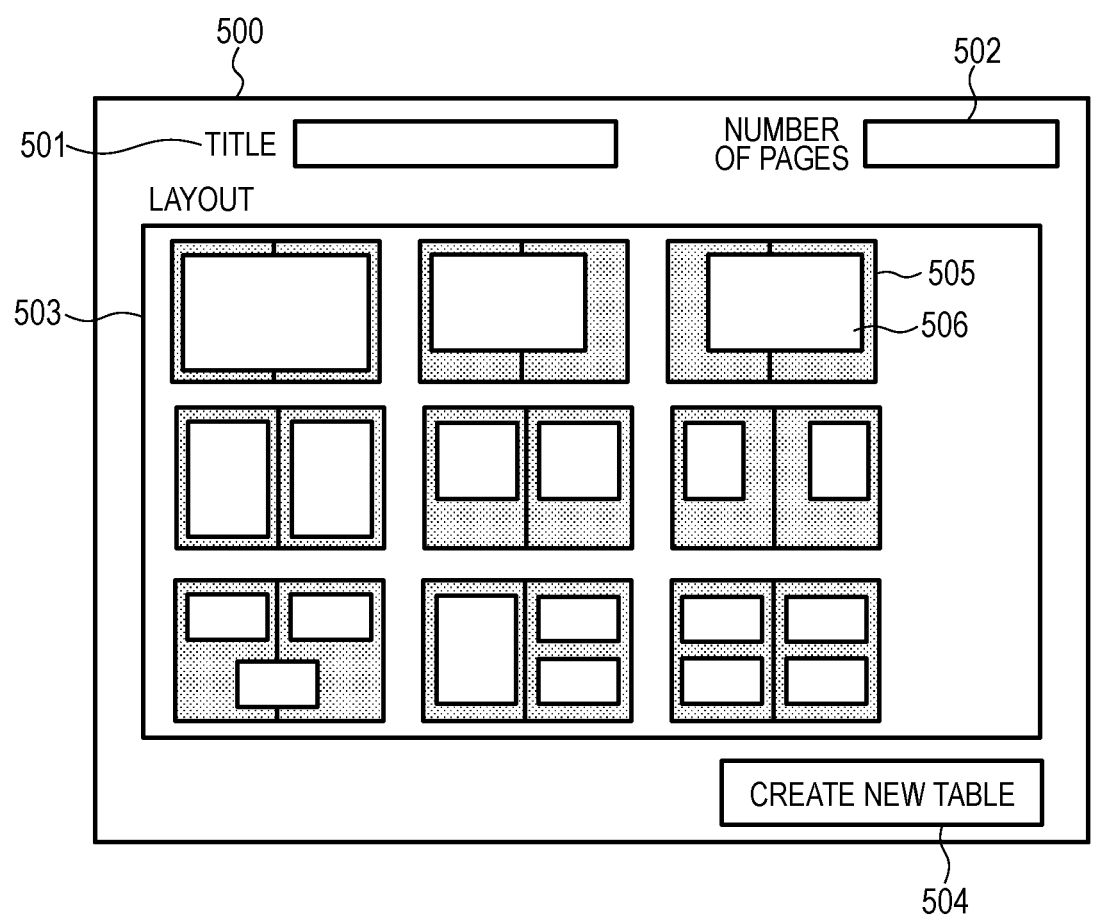
FIG. 5 illustrates an example of a document creation screen according to the first embodiment.

First, in step S401, the CPU 101 starts execution of the present program. The CPU 101 displays a document creation screen 500 as illustrated in FIG. 5 on the display 110, for example. When the user specifies a title 501, the number of pages 502, and a layout 503 of the photo book and presses a new creation button 504, creation of a photo book is started. Here, the layout 503 refers to longitudinal and lateral sizes of page, the number of images and image arrangement in a page, and the like, and is selected from among several templates prepared in the present program in advance. In the present embodiment, a case where one image is arranged on each of right and left facing pages will be described. However, the present invention is not limited to this case. Different layouts 503 can be selected for the facing pages. Further, the photo book can be created and edited in units of one-side page.

The CPU 101 newly creates the book management table 300 as illustrated in FIG. 3A.

First, the CPU 101 newly issues and sets the book ID 301. Next, the CPU 101 sets the title 501, the number of pages 502, and the layout 503 of the photo book specified by the user to the title 302, the number of pages 307, and the layout information 308 in the book management table 300, respectively. Then, the CPU 101 records a current time to the book creation start date and time 304 in the book management table 300. Further, the CPU 101 stores the book ID 301 to a variable "cBookID" in the present program, for identifying a book in creation.

In step S402, the CPU 101 sets the status "in creation" to the status 303 in the book management table 300. Further, the CPU 101 creates the page management table 320 as illustrated in FIG. 3C by the number of pages of the book, and sets the page number 322 in ascending order. Then, the CPU 101 records the book ID 301 to the item of the book ID 323. In addition, the CPU 101 stores a default 1 (page) to a variable "cPageNO" in the present program, for identifying a page to be edited.

Figure 6:
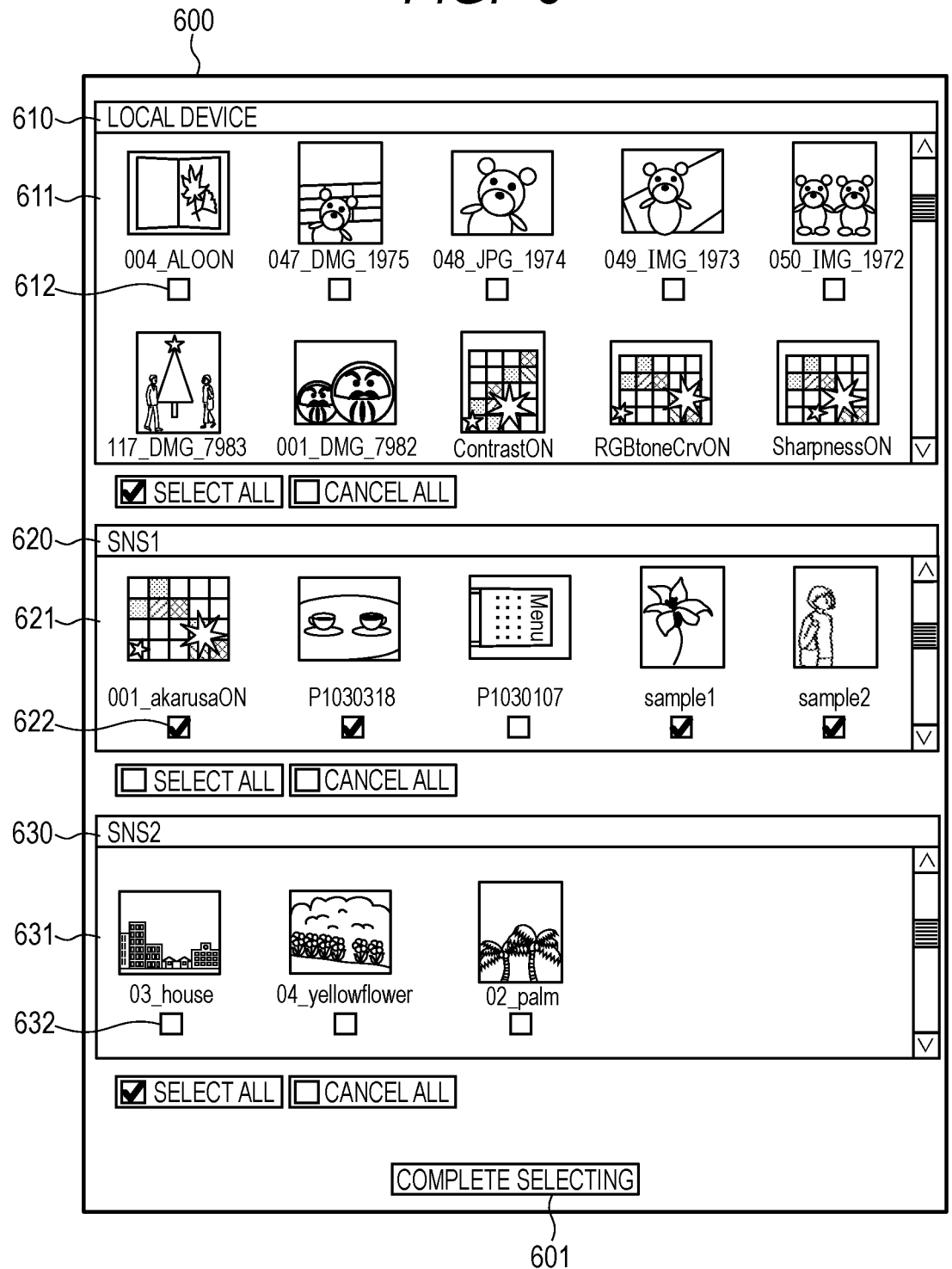
FIG. 6 illustrates an example of an image selection screen according to the first embodiment.

In step S403, the CPU 101 displays an image selection screen 600 as illustrated in FIG. 6 on the display 110, for example. The CPU 101 acquires thumbnails of images locally stored in the storage device 104, and copies the thumbnails to a storage location accessible from the present program. Then, the CPU 101 lists and displays the thumbnails in a thumbnail display region 611 arranged under a heading 610 of "local device".

Next, if there is an external SNS site that can provide images, which is registered in the SNS site management table 340 as illustrated in FIG. 3E, the CPU 101 displays the site names 341 of the SNS sites in SNS site name display regions 620 and 630. In the present embodiment, two external SNS sites that can provide images are registered. However, the present invention is not limited to this embodiment. The CPU 101 uses the URL 342 and the account information 343 for the SNS sites and acquires thumbnails of images to be provided, using an application programming interface (API) provided by the SNS site. The CPU 101 copies the acquired thumbnails to a storage location accessible from the present program, and displays a list in thumbnail display regions 621 and 631 of the SNS sites.

On the image selection screen 600 as illustrated in FIG. 6, the user selects images that the user wishes to use for the photo book from among the images displayed in the thumbnail display region 611 of the local device and/or the thumbnail display regions 621 and 631 of the SNS sites. Then, the user presses a selection completion button 601.

In step S404, the CPU 101 detects the image selection by the user, stores the selected image list to a variable "sImageList" in the present program, and acquires the images selected by the user.

When acquiring images from the local device, the CPU 101 copies the images stored in the storage device 104 to a storage location accessible from the present program.

When acquiring images from an SNS site, the CPU 101 uses the URL 342 and the account information 343 of the SNS site and acquires the images of a size necessary for printing, using the API provided by the SNS site. The CPU 101 copies the acquired images to a storage location accessible from the present program.

In step S405, the CPU 101 creates the image management table 310 as illustrated in FIG. 3B for individual images included in the selected image list variable "sImageList". The CPU 101 newly issues the image ID 311 and sets a value of the variable "cBookID" indicating the book in creation to the book ID 314.

When the images are acquired from the local device, the CPU 101 sets "local device" to the image acquisition source information 318. When the images are acquired from the SNS site, the CPU 101 sets the SNS site name 341 to the image acquisition source information 318.

The CPU 101 stores paths to the storage locations of the images and the thumbnails accessible from the present program to the image file path 312 and the thumbnail file path 313, respectively. The CPU 101 extracts image information from metadata of the acquired images and stores the image information to the image size 315 and the capturing device name 317.

In step S406, the CPU 101 arranges the images specified with the selected image list variable "sImageList" to the pages according to the layout information 308 of the book. The CPU 101 lists the image ID 311 of the image arranged in the page to the item of the image ID list 321 in the page management table 320 of each page.

Figure 7:
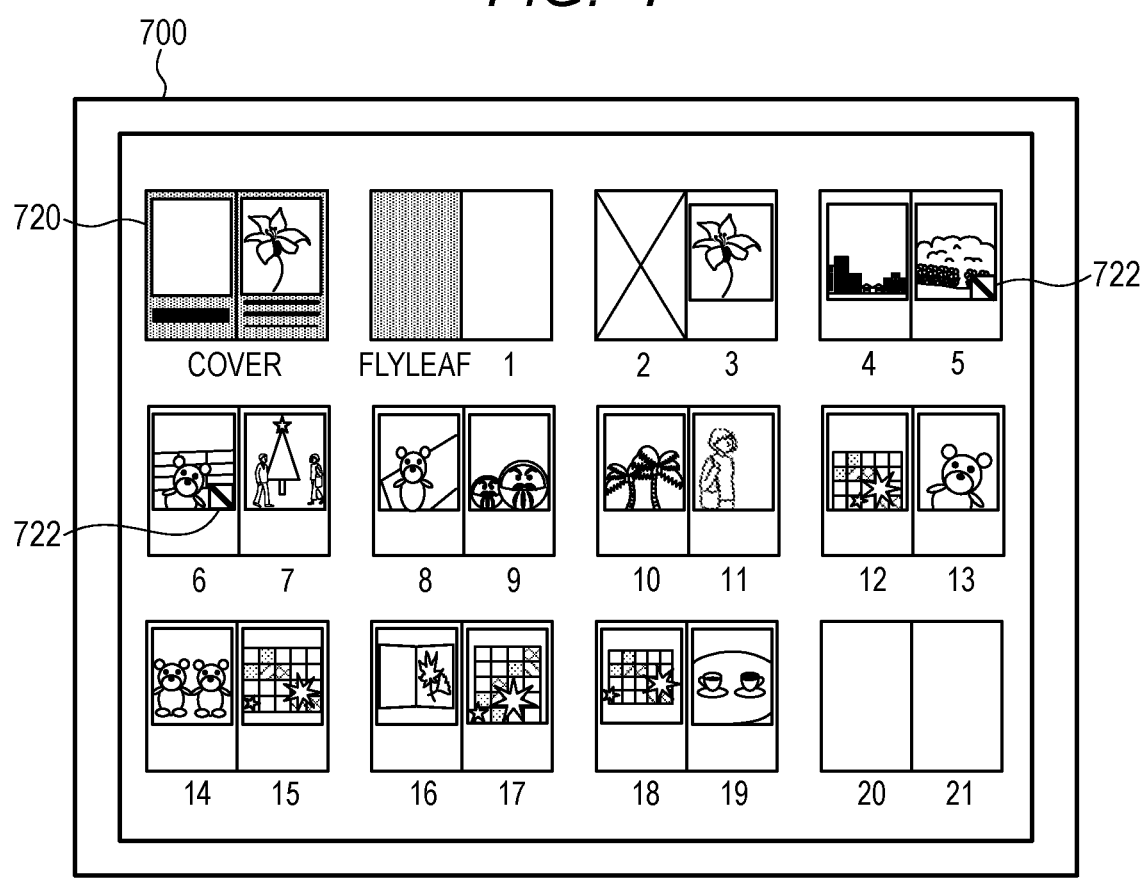
FIG. 7 illustrates an example of a page list screen according to the first embodiment.

In step S407, the CPU 101 displays, for example, a page list screen 700 illustrated in FIG. 7 on the display 110. That is, the CPU 101 creates a thumbnail preview for each page on the basis of the thumbnail file path 313 in the image management table 310, of the image arranged in each page, and displays a list of the thumbnail previews in a page list region 720. The thumbnail for display has different appearance from the image actually printed by a printer due to a display size of the thumbnail, display capability of the display, and the like. Therefore, at this point of time, it is difficult for the user to recognize the difference in image quality of the images in the page, which may occur after printing. That is, the thumbnail image displayed on the thumbnail preview is a reduced image and the image size is smaller than the original image. Therefore, any of the images tends to be coarsely displayed, and the image quality of any image looks the same for the user. In contrast, since the original images actually output to a printing device have various image sizes, a difference in image quality of the images is caused on a printed matter. Therefore, it is difficult for the user to recognize the difference in image quality of the images generated on the printed matter, by simply comparing the thumbnail images on the thumbnail preview.

In step S408, the CPU 101 compares the quality of all the images in the photo book, in response to a predetermined operation by the user. The predetermined operation by the user is, for example, a selection operation of an image comparison button (not illustrated) displayed on the page list screen 700 in FIG. 7. Also, in performing the quality comparison, the CPU 101 stores in advance a reference value (%) of a difference in image size as a constant "fRate" in the present program. The difference in image size is a ratio of an image size of each image to a maximum image size among the images in the photo book. Further, the CPU 101 stores in advance a threshold of a ratio of the number of images as a constant "alertRate" in the present program. The threshold is used to determine whether providing a warning about the difference in image quality in the photo book. The ratio of the number of images is a ratio of the number of images having different image quality to a total number of images in the photo book. In a case of printing a photo book, "fRate" may be changed according to printing conditions or a printing profile because "fRate" is a numerical value depending on the printing device, the print medium, and the printing size of the image area where the image is arranged.

The CPU 101 acquires image information of all the images having the value of the book ID 314 in the image management table 310, the value being matched with a value of the variable "cBookID" that indicates the book in creation. The CPU 101 acquires the image size 315 by reference to the image information of each image in the book and the size of the image area where each image is arranged by reference to the layout information. Then, the CPU 101 calculates image resolution from the image size 315 of each image and the size of the image area and compares the image resolution of the images. In a case where the image is trimmed and arranged in the image area, the CPU 101 calculates the image resolution, using the number of pixels in a trimming area of the image as the image size. As a result of the comparison, if the image resolution is equal and the difference in the image size 315 is less than the constant "fRate", the CPU 101 determines that all the images in the photo book have the quality at the same level. As a result of the comparison, if the difference in the image resolution is within a predetermined reference value, the CPU 101 may consider that the image resolution is equal. In this case, if the image resolution is substantially equal and the difference in the image size 315 is less than the constant "fRate", the CPU 101 determines that the quality of the images is at same level. Further, the CPU 101 may compare only the image resolution, and if the difference in the image resolution does not exceed a predetermined reference value, the CPU 101 may determine that the quality of the images is at the same level. When the CPU 101 determines that all the images in the photo book have the quality at the same level (YES in step S408), there is no need for editing, and thus proceeds to step S409, and the book creation is completed.

When the CPU 101 determines that not all the images in the photo book have the quality at the same level (NO in step S408), the CPU 101 classifies all the images in the photo book into groups of images having the quality at the same level in step S410. In a case where the ratio of the number of images in a group is less than the threshold "alertRate", the CPU 101 considers that the images belonging to the group are the minority with respect to the entire book. Then, the CPU 101 sets the item of the in-book image quality check 319 to "ON" in the image management table 310 of the images. If the ratio of the number of images in a group is the threshold "alertRate" or more, the CPU 101 considers that the images belonging to that group are the majority with respect to the entire book. Then, the CPU 101 sets the item of the in-book image quality check 319 to "OFF" in the image management table 310 of the images.

The CPU 101 refers to the item of the in-book image quality check 319 set for each image. When the item of the image is set to "ON", the CPU 101 displays information indicating that the image quality of the image has a difference from the image quality of another image, near the thumbnail of the image. For example, on the page list screen 700 as illustrated in FIG. 7, a warning mark 722 is superimposed and displayed on the thumbnail of the image.

Figure 8:
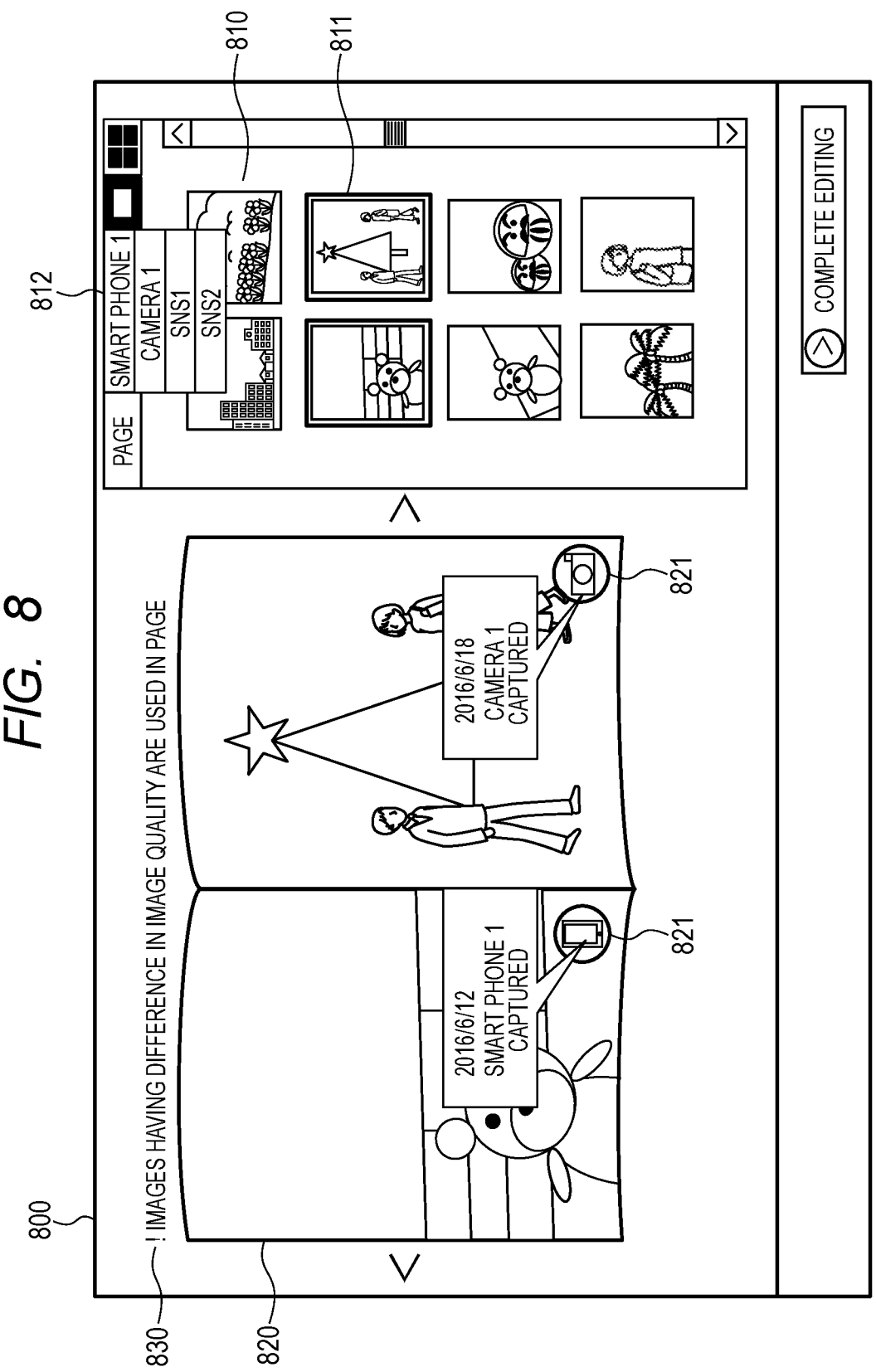
FIG. 8 illustrates an example of a page editing screen according to the first embodiment.

In step S411, the CPU 101 sets the status 303 of the book to "in editing". In step S412, the CPU 101 displays a page list region 810 of a page editing screen 800 on the display 110, as illustrated in FIG. 8, for example. The user selects a page to be edited from the page list displayed in the page list region 810. The CPU 101 stores the number of the selected page to a variable "cPageNO" in the present program. The CPU 101 displays a mark 811 in the page list region 810 so that the selected page can be identified.

In addition, the CPU 101 creates a control list 812 in which the capturing device name 317 and SNS site names of the image acquisition source information 318 in the image management table 310 of all the images included in the book are collected and listed. The CPU 101 superimposes and displays the control list 812 on the page list region 810. When the user selects a specific capturing device or SNS site from the control list 812, the CPU 101 displays only images having matching capturing device names or SNS site names.

In step S413, the CPU 101 searches the page management table 320 associated with the variables "cBookID" and "cPageNO", for identifying a book and a page to be edited. Then, the CPU 101 stores the image ID list 321 to be arranged on the page to a variable "pImageList".

In step S414, the CPU 101 searches each image management table 310 associated with each image ID retrieved from the variable "pImageList". The CPU 101 acquires the thumbnail file path 313, the image size 315, the capturing device name 317, and the image acquisition source information 318 for each image.

In step S415, the CPU 101 displays a page image region 820 of the page editing screen 800 on the display 110, as illustrated in FIG. 8, for example. In the page image region 820, a state in which the images in the page to be edited are arranged according to the layout information 308 is displayed using the thumbnails of the images.

In step S416, the CPU 101 compares the quality of the images in the page to be edited in response to a predetermined user operation. The predetermined user operation is, for example, a selection operation of an image comparison button (not illustrated) displayed in the page editing screen 800 in FIG. 8. That is, the CPU 101 compares the image size 315 and the image resolution by reference to the image information of the images in the page. As a result of the comparison, if the image resolution is equal and the difference in the image size 315 is less than the constant "fRate", the CPU 101 determines that the quality of the images in the page is at same level. As a result of the comparison, if the difference in the image resolution is within a predetermined reference value, the CPU 101 may consider that the image resolution is equal. In this case, if the image resolution is substantially equal and the difference in the image size 315 is less than the constant "fRate", the CPU 101 determines that the quality of the images is at same level. Further, the CPU 101 may compare only the image resolution, and if the difference in the image resolution does not exceed a predetermined reference value, the CPU 101 may determine that the quality of the images is at the same level.

When the CPU 101 determines that the images in the page have the quality at approximately the same level (YES in step S416), there is no need to warn about the difference in image quality of the individual images. Therefore, the CPU 101 sets the item of the in-page image quality check 324 in the page management table 320 to "OFF", and proceeds to step S419.

When the CPU 101 determines that the images in the page do not have the quality at the same level (NO in step S416), the CPU 101 sets the item in the in-page image quality check 324 in the page management table 320 to "ON", and proceeds to step S417.

In step S417, the CPU 101 displays, in a warning region 830 on the page editing screen 800, a message notifying that images having a difference in image quality are used in the page, as illustrated in FIG. 8.

In step S418, the CPU 101 displays an image acquisition source icon 821 near the thumbnail image of each image in the page to be edited.

That is, the CPU 101 determines whether the image acquisition source information 318 of each image is "local device". When the image acquisition source information 318 is "local device", the CPU 101 searches the capturing device management table 330 in FIG. 3D associated with the capturing device name 317 in the image management table 310 regarding the image. Then, the CPU 101 acquires the device type (smartphone, compact digital camera, single lens reflex camera, etc.) 332 and the image file path 333 of a device icon. The CPU 101 displays the image acquisition source icon 821 on the basis of the image file path 333.

The CPU 101 may add a region such as a pop-up or a balloon in association with the device icon and display the capturing device name 331, capturing date and time, and the like in the region. The method of displaying the capturing device is not limited in the present invention.

Further, in the present embodiment, the icon of the capturing device is displayed near the thumbnail image, assuming that the difference in the image quality due to the image resolution and the image size is caused by the difference in the capturing device. However, there may also be a case where even if the capturing device is common, the image quality differs depending on a capturing mode. In this case, icons representing characteristics of an image, such as the capturing mode, presence or absence of zooming, and things derived from a moving image, may be further displayed. Designs and types of the icons are not limited in the present invention.

If the image acquisition source information 318 is other than "local device", the CPU 101 considers the image as an image acquired from an SNS site. The CPU 101 searches the SNS site management table 340 in FIG. 3E associated with the SNS site name stored in the image acquisition source information 318, and acquires the image file path 344 of an SNS icon. Then, the CPU 101 displays the image acquisition source icon 821 on the basis of the image file path 344.

The CPU 101 may add a region such as a pop-up or a balloon in association with the SNS icon and display the SNS name and the like in the region. The method of displaying the SNS name and the like is not limited in the present invention.

The CPU 101 provides the image acquisition source icon 821 and the control list 812 to the user to support editing of the page by replacement of an image when there is an image having different image quality in the page.

In step S419, the CPU 101 determines whether or not there is still a page to be edited, in response to an input from the user. When there is still the page to be edited (YES in step S419), the CPU 101 stores a new page number selected by the user to the variable "cPageNO", and returns to step S413. When there is no page to be edited (NO in step S419), the CPU 101 proceeds to step S409, and the book preparation is completed. The user can print the book.

In the present embodiment, the image quality of the images respectively arranged on the same facing pages are compared. Alternatively, the image quality of the images arranged on the same one-side page may be compared.

Further, in the present embodiment, after the page list screen 700 is displayed on the display 110 in step S407, whether or not the image quality of the images in the book is at the same level is determined in response to the user's operation, and the warning is displayed in step S410 if there is a difference in the image quality. Further, after the page editing screen 800 is displayed on the display 110 in step S415, whether or not the image quality of the images in the page is at the same level is determined in response to the user's operation, and the warning is displayed in step S417 if there is a difference in the image quality. The present invention is not limited thereto. After whether or not the image quality of the images in the book or the image quality of the images in the page is at the same level is determined, the page list screen 700 or the page editing screen 800 with a warning may be automatically displayed according to a determination result. With such a configuration, in a case where there is a difference in the image quality, the fact of the difference can be notified even if the user does not perform an operation.

Further, in the present embodiment, comparison is made on the basis of the image size and the image resolution as the information regarding the image quality of the images. However, another information may be used for the comparison. For example, the types of capturing devices used for acquisition of images are compared and if the types are different, occurrence of a difference in image quality is expected, and the expectation may be notified. Further, the acquisition sources of the images may be used instead of the capturing devices. Further, the image quality may be compared according to color information of the images. For example, when the color information of an image arranged on the left-side page of facing pages is monochrome and the color information of an image arranged on the right-side page is partially red on the basis of monochrome, the left-side page is printed with a black ink and the right page is printed with a color ink. Thus, the tone of color in black and white may differ in the facing pages. If occurrence of a difference in image quality is expected according to the color information, the expectation may be notified. The color information of the image is acquired from the metadata of the image, or is acquired from a recipe of the image, which indicates a parameter of color adjustment, when color adjustment processing has been performed for the image.

Second Embodiment

FIG. 9 is a functional block diagram of an information processing apparatus 100 according to the present embodiment. Focusing on the functional aspect, the information processing apparatus 100 includes an acquisition unit 1201, an arrangement unit 1202, a comparison unit 1203, a notification unit 1204, a setting unit 1205, and a display unit 1206. The acquisition unit 1201 acquires an attribute of content, such as image quality of an image stored in a storage device 104. The arrangement unit 1202 arranges the content on a page of a document and arranges an image in an image region, for example. The image region is a rectangular region into which at least a part of image data is inserted and displayed. The comparison unit 1203 compares the attribute of the content with a predetermined condition. The notification unit 1204 displays, on a screen, notification information based on a result of the comparison by the comparison unit 1203. For example, the notification unit 1204 displays a warning about the image, as the notification information indicating that the predetermined condition is not satisfied and the image quality of the arranged image is not suitable for the layout, and changes the size of warning display in response to a user operation. The setting unit 1205 sets an amount of the notification information to be displayed, and the notification unit 1204 displays the notification information on the screen according to the set amount. The display unit 1206 displays, on a display 110, screens (a page list screen, etc.) of respective display modes such as a mode to confirm the layout of the page and a mode to edit the layout. On the page list screen, the layouts of pages are displayed as a list, and images arranged in the image region are displayed using corresponding thumbnail images. The functions of the information processing apparatus 100 are realized by a CPU 101 reading and executing predetermined programs stored in a ROM 102 and the storage device 104. That is, the CPU 101 may function as the acquisition unit 1201, the arrangement unit 1202, the comparison unit 1203, the notification unit 1204, the setting unit 1205, and the display unit 1206.

Hereinafter, as an embodiment of the present invention, the information processing apparatus 100 for supporting creation of a document including images and a computer program (hereinafter referred to as "the present program") operable on the information processing apparatus 100 will be described. The information processing apparatus 100 and the present program use various management tables as illustrated in FIGS. 10A to 10D as needed. The management tables may be stored in the RAM 103 and the storage device 104 and used.

A document management table 1300 illustrated in FIG. 10A includes a document ID 1301, and manages information of a document identified with the document ID 1301. The document ID 1301 is an integer-type item, and is an identifier (ID) issued when the document creation is started. The document management table 1300 includes a title 1302, a status 1303, the number of pages 1304, and a layout type 1305 of a page, as items associated with the document ID 1301.

The title 1302, the number of pages 1304, and the layout type 1305 are character string-type, integer-type, and character string-type items, respectively, and are set by a user at the start of document creation. The layout type 1305 is selected by the user from among several templates prepared in advance in the present program. The layout type 1305 may be commonly set for the entire document, or implementation to enable setting change for each page is also possible. The present invention is not limited to this embodiment. The status 1303 is a character string-type item, and indicates a state of the document, such as start of creation, start of editing, in editing, in preview, completion, and printed.

A page management table 1310 as illustrated in FIG. 10B includes a page number 1311 and a document ID 1312, and manages information of a page identified with the page number 1311 and the document ID 1312. The page number 1311 is an integer-type item, and indicates which page from the first page of the document, for example. The document ID 1312 is an integer-type item, and corresponds to the above document ID 1301. A page of a document is provided with one or a plurality of rectangular image regions according to the layout type 1305. The shape of the image region is not limited to the rectangle. The page management table 1310 includes an image region ID list 1313 and page layout information 1314, as items associated with the page number 1311.

The image region ID list 1313 is an integer-type item, and is a list of image region IDs 1321 described below. The page layout information 1314 is a character string-type item, and describes longitudinal and lateral sizes (in inches or millimeters) of a page, the number of image regions in the page, the positions of the image regions in the page, and the like.

An image region management table 1320 as illustrated in FIG. 10C includes an image region ID 1321 and a document ID 1323, and manages information of an image region identified with the image region ID 1321 and the document ID 1323. The image region ID 1321 is an integer-type item, and is an ID attached to an individual image region. The document ID 1323 is an integer-type item, and corresponds to the above document ID 1301. The image region management table 1320 includes an image ID 1322, a region size 1324, an enlargement ratio 1325, and an image quality check result 1326, as items associated with the image region ID 1321.

The image ID 1322 is an integer-type item, and is an ID of an image arranged in the image region. The region size 1324 is an integer-type item, and indicates longitudinal and lateral sizes (in inches or millimeters) of the image region. When an image is arranged in the image region, the image is enlarged (or reduced) to be fit within the image region. The enlargement ratio 1325 is an integer-type item, and is an enlargement ratio of the image when the image is arranged in the image region. The image quality check result 1326 is an integer type-item, and indicates whether or not the display enlargement, the resolution, and the like of the image are suitable for printing.

An image management table 1330 illustrated in FIG. 10D includes an image ID 1331 and a document ID 1334, and manages information of an image identified with the image ID 1331 and the document ID 1334. The image ID 1331 is an integer-type item, and corresponds to the image ID 1322 described above. The image ID 1331 is issued at timing when the user acquires an image from the storage device 104 or an SNS server 113 through a network 112. The document ID 1334 is an integer-type item, and corresponds to the document ID 1301 described above. The image management table 1330 includes an image file path 1332, a thumbnail file path 1333, an image size 1335, and image resolution 1336, as items associated with the image ID 1331.

The image file path 1332 and the thumbnail file path 1333 are character string-type items, and indicate paths to access an image file and a thumbnail image file from the present program. The thumbnail file path 1333 is used for display on the display 110, and the image file path 1332 is used for printing. The image size 1335 and the image resolution 1336 are integer-type items, and can be included in meta information of an image file. The image size 1335 is expressed by the numbers of pixels in vertical and horizontal directions of the image, and the image resolution 1336 is expressed by, for example, dot per inch (dpi), pixel per inch (ppi), or the like.

Figure 11:
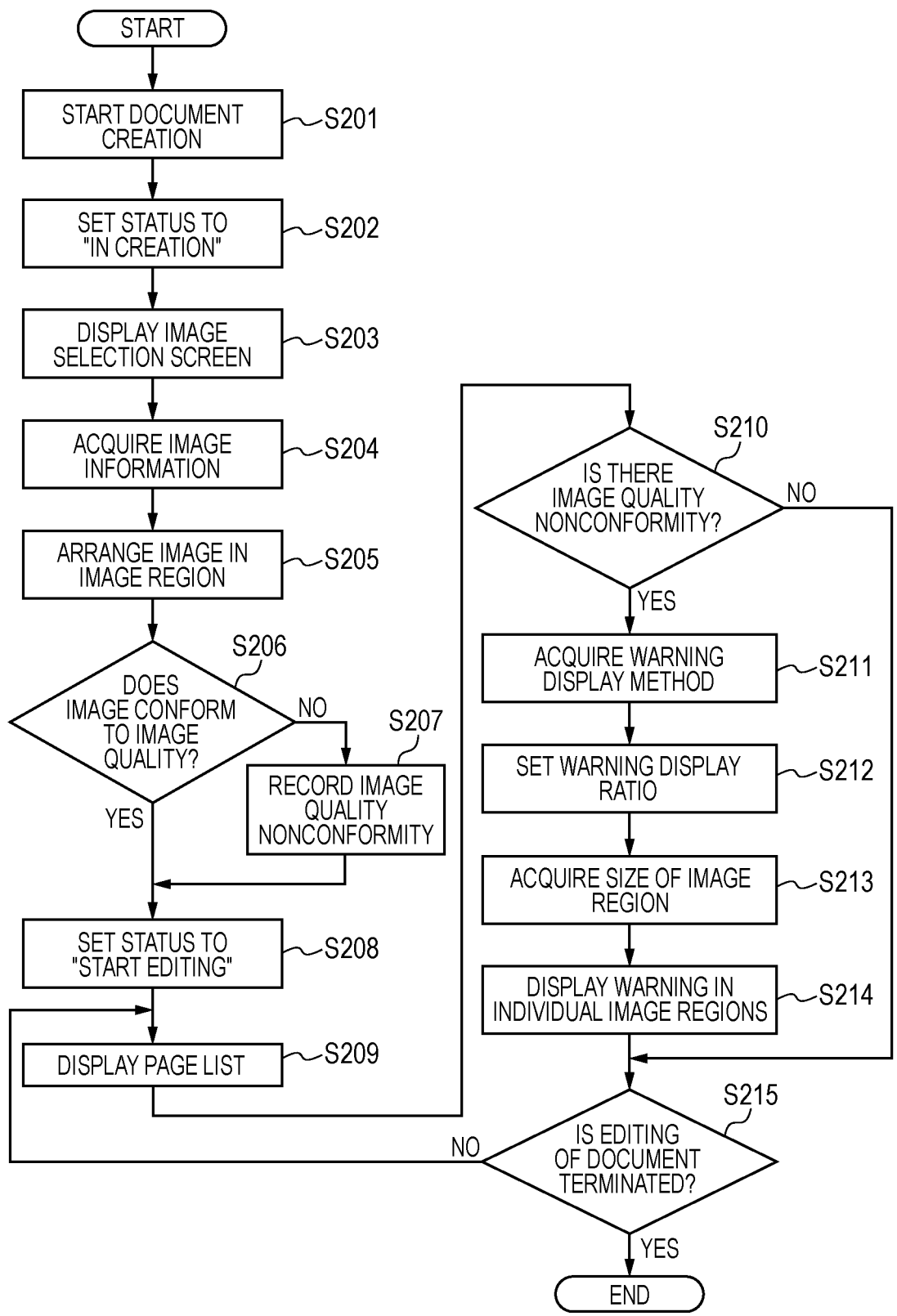
FIG. 11 is a flowchart illustrating document creation processing according to the second embodiment.

FIG. 11 is a flowchart illustrating document creation processing in the information processing apparatus 100. First, when the user performs a starting operation from an input/output device 111, in step S201, the CPU 101 starts execution of the present program. The CPU 101 displays, on the display 110, a document creation screen 500 for newly creating a document. An example of the document creation screen 500 is illustrated in FIG. 5.

On the document creation screen 500, the user specifies a title 501, the number of pages 502, and a layout 503, of a document, and presses a new creation button 504. Here, the layout 503 refers to information such as longitudinal and lateral sizes of a page, the number of images in the page, image arrangement, and the size of an image region, and several different templates are prepared in the present program in advance. In FIG. 5, nine types of templates 505 in units of facing pages are illustrated as examples. Each template 505 includes one or a plurality of image regions 506. The user can select a desired layout from these templates 505. The same layout can be selected for all the pages, and different layouts can be selected for the respective pages. The invention is not limited to the illustrated types of the layout.

When the new creation button 504 is pressed, the CPU 101 newly creates the document management table 1300 (FIG. 10A). The CPU 101 newly issues the document ID 1301 and sets the document ID 1301 to the document management table 1300. Next, the CPU 101 sets the title 501, the number of pages 502, and the layout 503 of the document specified by the user to the title 1302, the number of pages 1304, and the layout type 1305 in the document management table 1300, respectively. Further, the CPU 101 stores the document ID 1301 to a variable "cDocID" in the present program, for identifying a document in creation.

In step S202, the CPU 101 sets "creation start" to the status 1303 in the document management table 1300. Further, the CPU 101 creates the page management table 1310 (FIG. 10B) by the number of pages of the document and sets the page number 1311 in ascending order. The CPU 101 records "cDocID" in the document ID 1312 and sets information of the layout of the individual pages to the page layout information 1314. Further, the CPU 101 stores 1 as a default value to a variable "cPageNO" in the present program, for identifying a page to be edited.

Further, the CPU 101 creates the image region management table 1320 (FIG. 10C) by the number of image regions of the pages in the document according to the template of the selected layout, and sets the image region ID 1321 in ascending order. The CPU 101 records "cDocID" in the item of the document ID 1323 and sets the region size 1324 according to the layout information. The CPU 101 stores the created image region ID 1321 to the image region ID list 1313 in the page management table 1310 for each page.

In step S203, the CPU 101 displays an image selection screen 600 on the display 110. An example of the image selection screen 600 is illustrated in FIG. 6. First, the CPU 101 acquires thumbnail images of images stored in a local device such as the storage device 104, and copies the thumbnail images to an accessible storage location such as the RAM 103. The CPU 101 displays a list of the acquired thumbnail images in a thumbnail display region 611 arranged under a heading 610 described as "local device". In the thumbnail display region 611, an image name is displayed under the thumbnail image.

The acquisition source of the images is not limited to the local device, and may be a digital camera, a smartphone, or the like that can directly communicate with the information processing apparatus 100. Further, information (URLs, account information, etc.) of external SNS sites may be registered in the information processing apparatus 100 in advance, and images may be acquired from the external SNS sites through the network 112. In this case, the CPU 101 displays site names of SNS sites in headings 620 and 630. The CPU 101 can acquire thumbnail images corresponding to the images, using an API provided by the SNS sites. The CPU 101 copies the acquired thumbnail images to an accessible storage location such as the RAM 103, and also displays the thumbnail images in lists in thumbnail display regions 621 and 631 of the SNS sites. In the thumbnail display regions 621 and 631, image names are displayed under the thumbnail images. When the CPU 101 has acquired the thumbnail images from a plurality of SNS sites, the CPU 101 displays a list of the thumbnail images for each SNS site.

On the image selection screen 600 (FIG. 6), the user selects images that the user wishes to arrange in the document from among the thumbnail images displayed in the thumbnail display region 611 of the local device and the thumbnail display regions 621 and 631 of the SNS sites. The user checks check boxes 612, 622, and 632 under the image names, and then presses a selection completion button 601.

In step S204, the CPU 101 stores the selected image list to a variable "sImageList" in the present program upon detecting depression of the selection completion button 601, and starts acquisition of the selected images. When acquiring the images from the local device, the CPU 101 copies the images stored in the storage device 104 to an accessible storage location such as the RAM 103. When acquiring the images from the SNS site, the CPU 101 downloads the images, using the API provided by the SNS site. The CPU 101 stores the acquired images to the storage device 104 and copies the images to an accessible storage location such as the RAM 103.

The CPU 101 creates the image management table 1330 (FIG. 10D) for each image included in the variable "sImageList". The CPU 101 newly issues the image ID 1331 and sets the value of the variable "cDocID" that indicates the document in creation to the document ID 1334. The CPU 101 stores the paths to the storage location of the images and the thumbnail images of the images to the image file path 1332 and the thumbnail file path 1333, respectively. The CPU 101 extracts image information included in metadata of the images and stores the image information to the image size 1335 and the image resolution 1336.

In step S205, the CPU 101 arranges the image specified with the variable "sImageList" in the image region of each page according to the page layout information 1314 of each page of the document. The CPU 101 lists the image regions stored in the image region ID list 1313 of the page management table 1310 of each page, and stores the image ID 1331 of the selected image list to the image ID 1322 of the image region management table 1320. Further, the CPU 101 calculates the enlargement ratio of the image such that the image can be fit within the image region in accordance with a short side or a long side of the image region, and stores the enlargement ratio to the enlargement ratio 1325. The processing of step S205 is executed for all the pages of the document.

In step S206, the CPU 101 performs a quality check for the image arranged in the document on the basis of the attribute of the image. In performing the quality check, the CPU 101 reads a reference value for the enlargement ratio of the image as a constant "fRate" in the present program. In addition to the reference value for the enlargement ratio, the CPU 101 may read a reference value for the resolution, and reference values for attributes (color format, color temperature, etc.) not suitable for printing. The CPU 101 acquires the attributes (the enlargement ratio, the resolution, the number of pixels, the file size, the color format, the color temperature, etc.) of the images. The CPU 101 compares the values of the items indicated by the attributes of the image arranged in the document with the reference values of the items as predetermined conditions, to determine whether or not the image quality conforms to printing quality. Since the reference values depend on a printing device and a printing medium, a plurality of the reference values may be set according to a printing profile so that the reference values are automatically switched according to the printing profile. For example, when the resolution of an enlarged and arranged image (an image after enlargement) falls below the reference value (NO in step S206), the CPU 101 determines image quality nonconformity, and stores a result to the image quality check result 1326 in the image region management table 1320 in step S207.

In step S208, the CPU 101 determines that preparation for starting document editing is completed, and sets "start of editing" to the status 1303 in the document management table 1300. The CPU 101 reads a display ratio of warning display as a constant in the present program, for each status of the document. The warning display is, for example, a warning mark indicating image quality nonconformity, and the display ratio is used when determining the amount (size and the number) of warning display displayed in the page list screen described below.

In the present embodiment, three types of constants: "sFirstWarn" for initial arrangement confirmation; "sEditWarn" in editing; and "sPrevWarn" in preview before printing, are used as display ratios. In addition, a variable "vSetWarn" to store the display ratio set by the user is also used for these system defined constants.

Figure 12A:
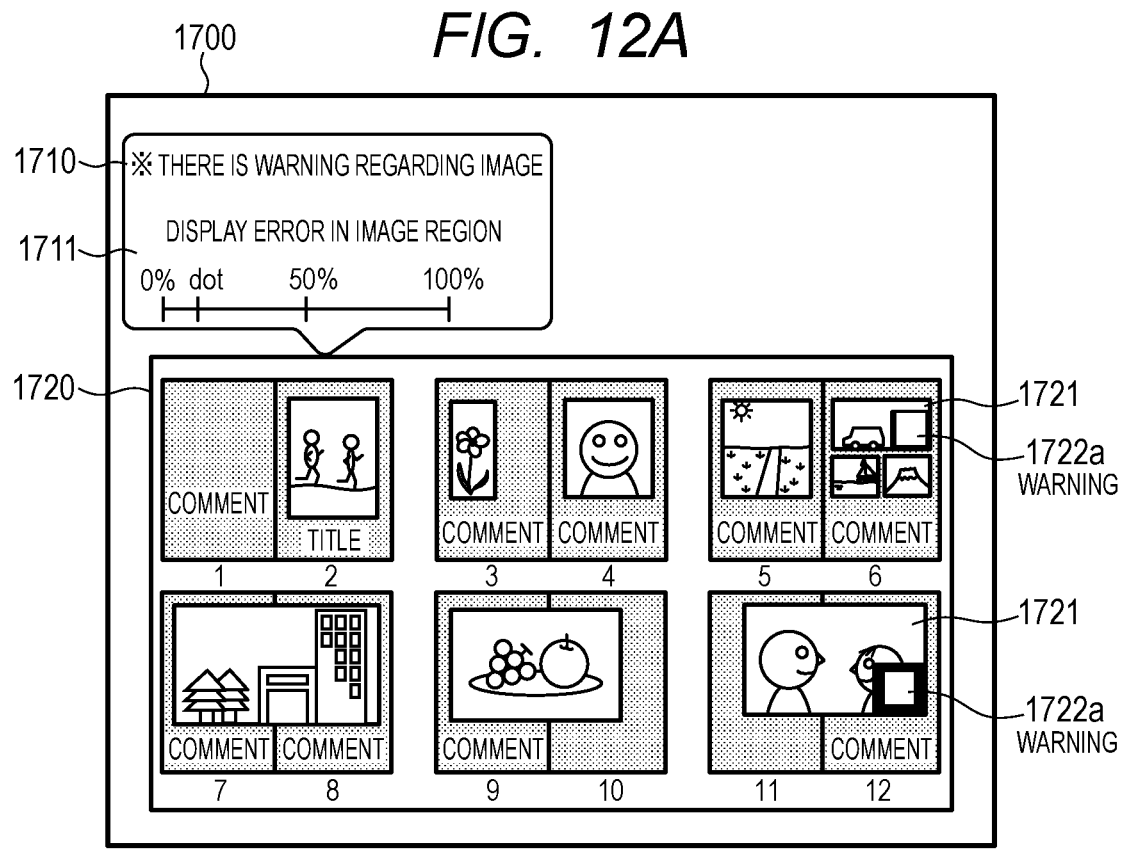
FIG. 12A is an example of a page list screen according to the second embodiment.

In step S209, the CPU 101 displays a page list screen 1700 on the display 110. An example of the page list screen 1700 is illustrated in FIG. 12A. The CPU 101 acquires the thumbnail images of the images arranged in the image regions of the pages, using the thumbnail file path 1333, on the basis of the document management table 1300, the page management table 1310, the image region management table 1320, and the image management table 1330. The CPU 101 assigns the thumbnail images to the image regions, and displays a list of the thumbnail images in a page list region 1720.

In step S210, the CPU 101 determines whether there is an image having image quality nonconformity in the document. The CPU 101 acquires the image quality check result 1326 for all the images having the value of the document ID 1323 in the image region management table 1320, the value being matched with the variable "cDocID". When the CPU 101 determines that there is no problem with the image quality (NO in step S210), the CPU 101 closes the page list screen 1700, proceeds to step S215, and waits for the next user operation. When the CPU 101 determines that there is an image having image quality nonconformity in the document (YES in step S210), the CPU 101 proceeds to step S211 to display a warning on the page list screen 1700.

In step S211, the CPU 101 acquires a warning display method set in the system. As default values corresponding to the warning display method, values of the display ratios of "sFirstWarn" for initial arrangement confirmation, "sEditWarn" in editing, and "sPrevWarn" in preview before printing are used. If the user has not set the warning display method, the CPU 101 selects an appropriate default value according to the document status and sets the default value to a variable "cDispWarn".

For example, in a case where images are arranged in the document, and then the page list screen is displayed for the first time, it is desirable that an arrangement result of the images, namely, the page layout is easy to see, while notifying the user of the warning about the image quality. Therefore, it is favorable to set the default value of the display rate "sFirstWarn" for initial placement confirmation, which is used when the status is start of editing, to medium (about 50%). Further in the status in editing in which the user performs rearrangement, deletion, and addition of pages on the page list screen 700, the warning display disturbs the editing operation. Therefore, it is favorable to set the default value of the display ratio "sEditWarn" in editing to a small value (about 0% to 10%). By setting the display ratio of the warning display in editing to be low, the user can concentrate on the editing work. Further, it is desirable for the user not to miss out the warning display in the status in preview in which the user performs final confirmation work of the document on the page list screen 700. Therefore, it is favorable to set the default value of the display ratio "sPrevWarn" in preview before printing to a maximum value (for example, 100%). When the display ratio is 100%, the warning display is performed with the maximum size, and when the display ratio is 10%, the warning display is performed with the size of 10% of the maximum size.

Alternatively, when the display ratio is the maximum, the warning display may be performed for each image determined to have image quality nonconformity. On the other hand, when the display ratio is 10%, images determined to have image quality nonconformity are classified according to arrangement positions or the like so that the warning displays is performed for 10% of the number of images determined to have unsuitable image quality, and the warning display may be performed for each group. The default value of the display rate for each of these statuses is managed as a system setting value and can be changed by the user according to usability.

Figure 13:
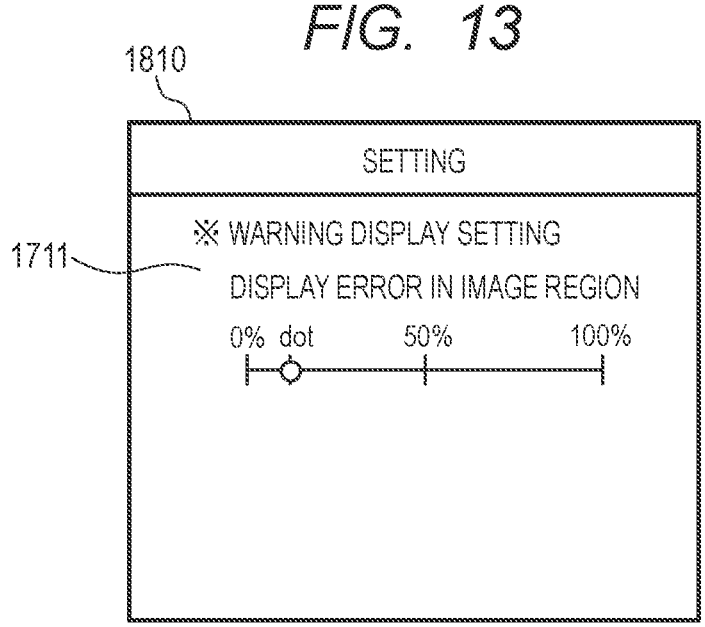
FIG. 13 illustrates an example of a warning setting screen according to the second embodiment.

In step S212, the CPU 101 displays a slider control 1711 for setting the display ratio of a warning message 1710 and a warning mark 1722 on the page list screen 1700. The user can set the display ratio of the warning mark 1722 for an image region 1721 by operating the slider control 1711. When the user sets the display ratio, the CPU 101 stores the set display ratio to the user-defined variables "vSetWarn" and "cDispWarn". In a case where it is difficult to secure a sufficient display region due to the limited display region like a screen of a mobile terminal, the slider control 1711 may be displayed on another setting screen independent of the page list screen 1700. For example, the user can set the display ratio of the warning mark 1722 by operating the slider control 1711 on a warning display setting screen 1810 as illustrated in FIG. 13.

In step S213, the CPU 101 acquires the region size 1324 of the image region having a non-conforming image quality check result 1326 in the image region management table 1320. In step S214, the CPU 101 creates, for example, a square warning mark 1722 for the image region 1721 for which the warning display is necessary. The length of one side of the warning mark 1722 is equal to the length obtained by multiplying the length of the short side of the image region 1721 by the display ratio "cDispWarn". The display ratio "cDispWarn" may indicate an area ratio of the warning mark 1722 to the image region 1721. The CPU 101 superimposes and displays the warning mark 1722 on the thumbnail image of the image region 1721.

Figure 12B:
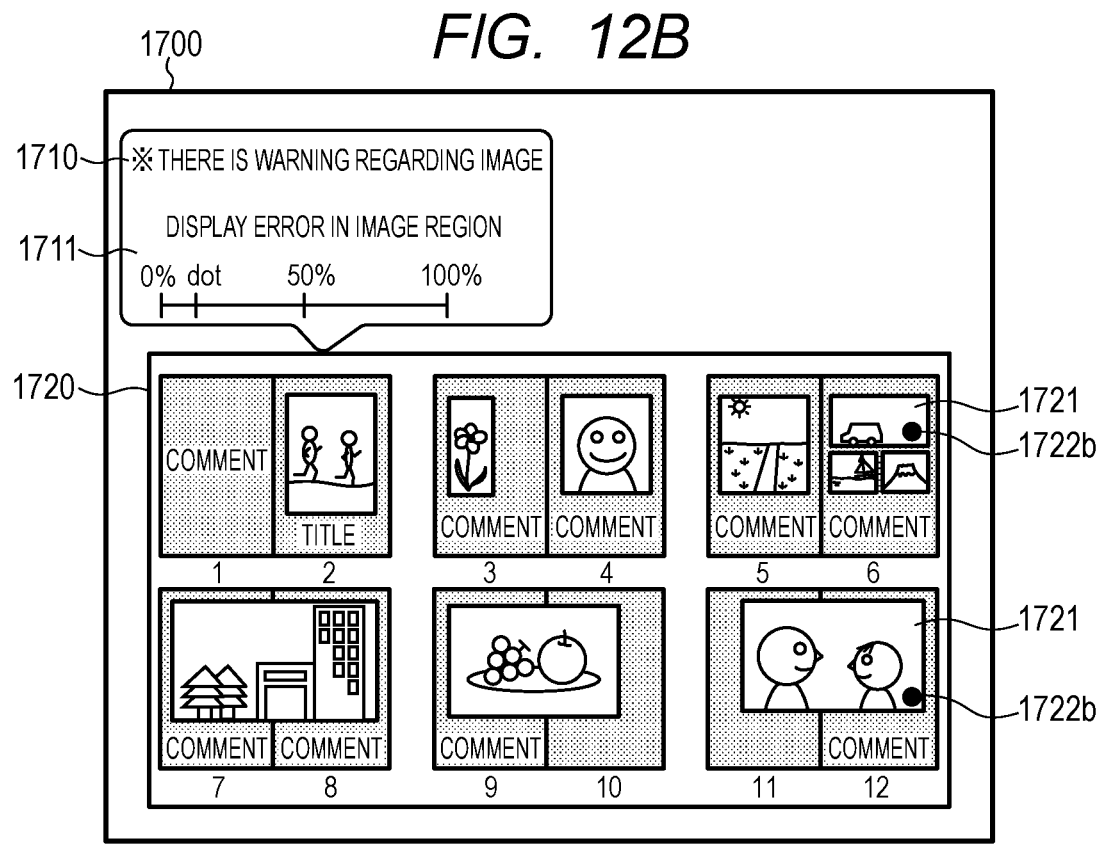
FIG. 12B is an example of the page list screen according to the second embodiment.
Figure 12C:
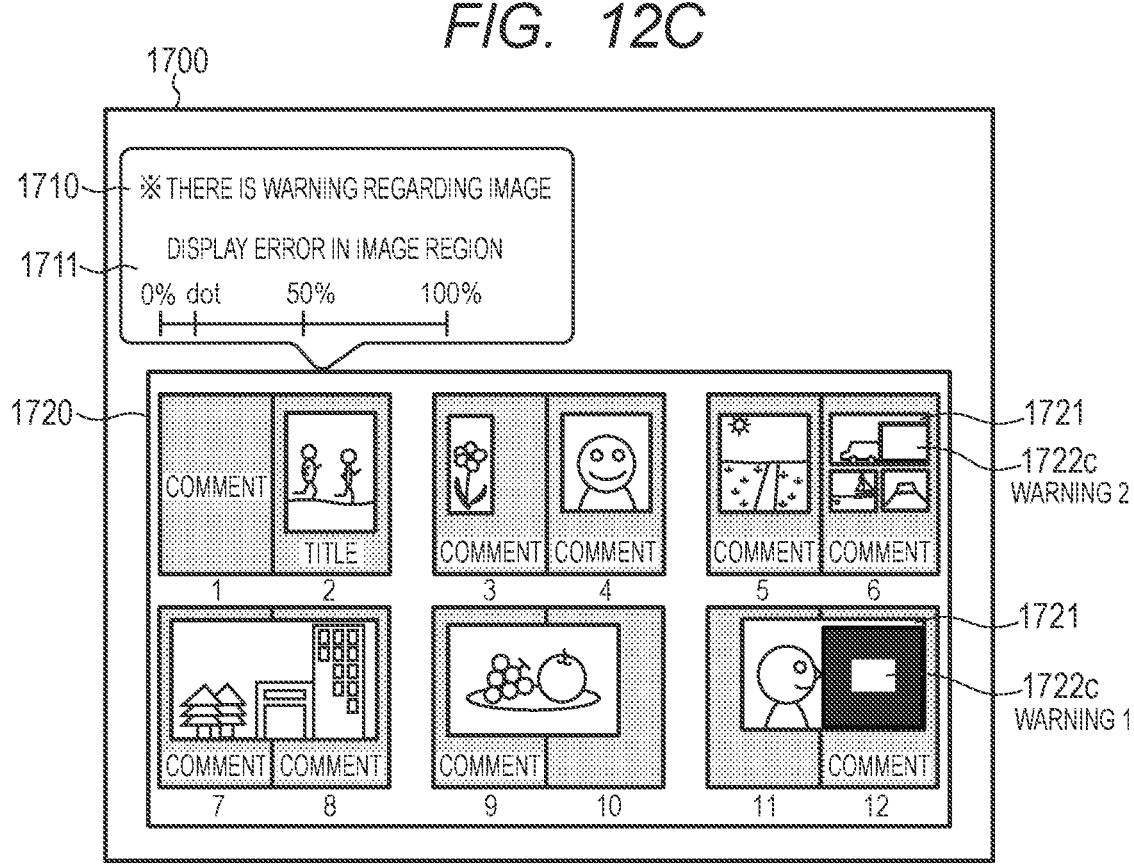
FIG. 12C is an example of the page list screen according to the second embodiment.

For example, when the display ratio "cDispWarn" is 50%, the CPU 101 creates a warning mark 1722a equivalent to 50% of the length of the short side of the image region 1721, and superimposes and displays the warning mark 1722a on the thumbnail image of the image region 1721, as illustrated in FIG. 12A. When the display ratio "cDispWarn" is smaller than a predetermined threshold (first threshold), the CPU 101 creates a dot-shaped warning mark 1722b, irrespective of the size of the image region 1721, and superimposes and displays the warning mark 1722b on the thumbnail image of the image region 1721, as illustrated in FIG. 12B. Further, when the display ratio "cDispWarn" is larger than a predetermined threshold value (second threshold value), the CPU 101 may differentiate the appearance of a warning mark 1722c according to the cause of determination that the image quality is unsuitable, as illustrated in FIG. 12C. For example, a plurality of the warning marks 1722c having different shapes, colors, characters, etc. is displayed so that a warning mark representing nonconformity of resolution and a warning mark representing nonconformity of color format can be distinguished at first glance.

In step S215, the CPU 101 determines whether or not termination of editing of the document is instructed upon receipt of an input from the user. For example, the CPU 101 detects whether or not an editing completion button (not illustrated) has been pressed on the page list screen 1700. When the CPU 101 determines to continue editing the document (NO in step S215), the CPU 101 sets the status 1303 of the document to "in editing", and returns to step S209. The user replaces or rearranges images on the page list screen 1700, and then presses the edit completion button.

When the CPU 101 determines that the editing of the document is to be terminated (YES in step S215), the CPU 101 sets the status 1303 of the document to "completed", and terminates the document creation processing. During and after termination of the document creation processing, the CPU 101 can execute document print processing. For example, when a print instruction of the document is input from the user, the CPU 101 sets "in preview" to the status 1303 in the document management table 1300 and displays the page list screen 1700 on the display 110 for the final confirmation before printing. When a print button (not illustrated) is pressed on the page list screen 1700, the CPU 101 outputs document data to a printing device such as a printer, and sets "printed" to the status 1303 in the document management table 1300.

According to the present embodiment, in an application to automatically arrange images and create a document, the page list screen for layout confirmation and editing work of the images arranged on pages is displayed. On the page list screen, the warning display in the case where the image quality of the image is not suitable for printing is performed in the individual image region. In a case where there are many warning displays concerning the image quality of the individual image regions and the warning displays disturb the layout confirmation of the pages and the editing work is delayed, the size of the warning display can be reduced or the number of the warning displays can be decreased according to the set ratio, and the notification can be made. With the configuration, means for prompting the user to perform the layout confirmation and the editing work of the pages after the images are arranged, and means for presenting the warning of each image region after the images are arranged to the user can coexist on the same screen.

In the present embodiment, a case of images has been described. The present embodiment can be similarly performed even in a case of content such as character strings that are arranged on pages of a document, instead of the images. In the case of character strings, a font size, modification, or the like is compared with a reference value, and warning display may be performed when the font size is too small according to a comparison result.

Further, in the present embodiment, the image quality nonconformity of when the document is printed by a printer is notified. The present embodiment can be similarly performed in a case of outputting the document by another output device such as a large display, instead of printing the document by the printer. In the case of a display, comparison may be performed using the number of pixels as the reference value.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-228030, filed Nov. 24, 2016, and Japanese Patent Application No. 2017-122238, filed Jun. 22, 2017, which are hereby incorporated by reference herein in their entirety.

What is claimed is:

1. An information processing apparatus comprising:
a processor; and
a memory storing a program which, when executed by the processor, causes the information processing apparatus to:
acquire information regarding image quality of an image;
arrange the image on each facing page;
compare the information regarding image quality of a plurality of the images arranged on each facing page;
display the plurality of the images arranged on the facing pages with notification information if a difference in the image quality of the plurality of the images arranged on the facing pages is larger than a predetermined reference value as a result of the comparison; and
display an icon representing source from which the image is acquired near the image if the difference in the image quality of the plurality of the images arranged on the facing pages is larger than a predetermined value as the result of the comparison.

2. The information processing apparatus according to claim 1,
wherein the displayed images are thumbnail images corresponding to the plurality of images arranged on the facing pages.

3. The information processing apparatus according to claim 1, wherein
the icon represents a type of a capturing device used for acquisition of the image.

4. The information processing apparatus according to claim 1, wherein
the information regarding image quality includes at least one of an image size, image resolution, a capturing device name, an image acquisition source, and color information.

5. The information processing apparatus according to claim 4, wherein
the difference is the difference in image size which exceeds a predetermined reference value.

6. The information processing apparatus according to claim 4, wherein
the difference is the difference in image resolution which exceeds a predetermined reference value.

7. The information processing apparatus according to claim 6, wherein
the predetermined reference value depends on a printing device and a printing medium to which the image is output.

8. The information processing apparatus according to claim 1, wherein
the icon is superimposed and displayed on the image.

9. The information processing apparatus according to claim 1,
wherein the notification information is displayed on a page editing screen for displaying the facing pages to be edited.

10. The information processing apparatus according to claim 1, wherein the program, when executed by the processor, further causes the information processing apparatus to provide a user interface for a user to support editing of each facing page by replacement of an image when the difference in the image quality of the plurality of the images arranged on the facing pages is larger than a predetermined reference value as the result of the comparison.

11. The information processing apparatus according to claim 1, wherein the information regarding image quality comprises color information, which indicates a parameter of color adjustment, when color adjustment processing has been performed for the images.

12. A method of controlling an information processing apparatus, the method comprising:
acquiring information regarding image quality of an image;
arranging the image on each facing page;
comparing the information regarding image quality of a plurality of the images arranged on each facing page; and
displaying the plurality of the images arranged on the facing pages with notification information, if a difference in the image quality of the plurality of the images arranged on the facing pages is larger than a predetermined reference value as a result of the comparison; and
displaying an icon representing source from which the image is acquired near the image if the difference in the image quality of the plurality of the images arranged on the facing pages is larger than a predetermined value as the result of the comparison.

13. A non-transitory computer-readable storage medium storing a program that, when executed by a processor, cause the processor to perform operations comprising:
acquiring information regarding image quality of an image;
arranging the image on each facing page;
comparing the information regarding image quality of a plurality of the images arranged on each facing page;
displaying the plurality of the images arranged on the facing pages with notification information, if a difference in the image quality of the plurality of images arranged on the facing pages is larger than a predetermined reference value as a result of the comparison; and displaying an icon representing source from which the image is acquired near the image if the difference in the image quality of the plurality of the images arranged on the facing pages is larger than a predetermined value as the result of the comparison.

* * * * *